(12) United States Patent
Robinson et al.

(10) Patent No.: US 11,216,045 B2
(45) Date of Patent: Jan. 4, 2022

(54) DETERMINING POSITION AND ORIENTATION OF A USER'S TORSO FOR A DISPLAY SYSTEM

(71) Applicant: Hewlett-Packard Development Company, L.P., Spring, TX (US)

(72) Inventors: Ian N Robinson, Palo Alto, CA (US); Nathan Nuber, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/485,230

(22) PCT Filed: Apr. 28, 2017

(86) PCT No.: PCT/US2017/030093
§ 371 (c)(1),
(2) Date: Aug. 12, 2019

(87) PCT Pub. No.: WO2018/199979
PCT Pub. Date: Nov. 1, 2018

(65) Prior Publication Data
US 2020/0057476 A1 Feb. 20, 2020

(51) Int. Cl.
*G09G 5/00* (2006.01)
*G06F 1/16* (2006.01)
(Continued)

(52) U.S. Cl.
CPC .............. *G06F 1/1694* (2013.01); *A45F 3/04* (2013.01); *G06F 3/011* (2013.01);
(Continued)

(58) Field of Classification Search
CPC ........ A45F 2003/001; A45F 2200/0516; A45F 2200/0525; A45F 3/04; G02B 2027/0134;
(Continued)

(56) References Cited

U.S. PATENT DOCUMENTS 7,301,648 B2  11/2007  Foxlin
8,972,182 B1*  3/2015  Foxlin ................. G01C 21/165
                                                                701/519
(Continued)

FOREIGN PATENT DOCUMENTS

CN    102713792    10/2012
CN    104407701    3/2015
(Continued)

OTHER PUBLICATIONS

Patel, S. et al., A Review of Wearable Sensors and Systems with Application in Rehabilitation, Apr. 20, 2012,< https://jneuroengrehab.biomedcentral.com/articles/10.1186/1743-0003-9-21 >.

*Primary Examiner* — Insa Sadio
(74) *Attorney, Agent, or Firm* — Dicke Billig & Czaja PLLC

(57) ABSTRACT

A display system includes a head-mountable 3D display device including at least one sensor to sense an absolute position and orientation of the 3D display device. The display system includes an accessory wearable by a user. The accessory includes at least one sensor to sense a relative position and orientation of the 3D display device relative to the accessory. An absolute position and orientation of a torso of the user may be determined based on the sensed absolute position and orientation of the 3D display device and the sensed relative position and orientation of the 3D display device relative to the accessory.

16 Claims, 4 Drawing Sheets

(51) Int. Cl.
*A45F 3/04* (2006.01)
*G06F 3/01* (2006.01)
*A45F 3/00* (2006.01)

(52) U.S. Cl.
CPC . *A45F 2003/001* (2013.01); *A45F 2200/0516* (2013.01); *A45F 2200/0525* (2013.01)

(58) Field of Classification Search
CPC ...... G02B 2027/014; G02B 2027/0187; G02B 27/0093; G02B 27/0172; G06F 1/1694; G06F 3/011; G06F 3/012; G06F 3/014
See application file for complete search history.

(56) References Cited

U.S. PATENT DOCUMENTS

| | | | |
|---|---|---|---|
| 2004/0201857 A1* | 10/2004 | Foxlin | G02B 27/017 356/620 |
| 2016/0033768 A1 | 2/2016 | Pedrotti et al. | |
| 2016/0259404 A1* | 9/2016 | Woods | G01S 19/42 |
| 2016/0266644 A1 | 9/2016 | Yamamoto | |
| 2016/0358181 A1 | 12/2016 | Bradski | |
| 2017/0053450 A1 | 2/2017 | Rodriguez et al. | |

FOREIGN PATENT DOCUMENTS

| | | |
|---|---|---|
| GB | 2300988 A | 11/1996 |
| WO | WO-2016141373 | 9/2016 |

* cited by examiner

DETERMINING POSITION AND ORIENTATION OF A USER'S TORSO FOR A DISPLAY SYSTEM

BACKGROUND

Augmented reality (AR) systems and virtual reality (VR) systems may include a head-mounted display (HMD) that is tracked in the 3D workspace. These systems may also include controllers for each of the user's hands, which are also tracked. The systems allow the user to interact with the virtual world.

DETAILED DESCRIPTION

Figure 1:
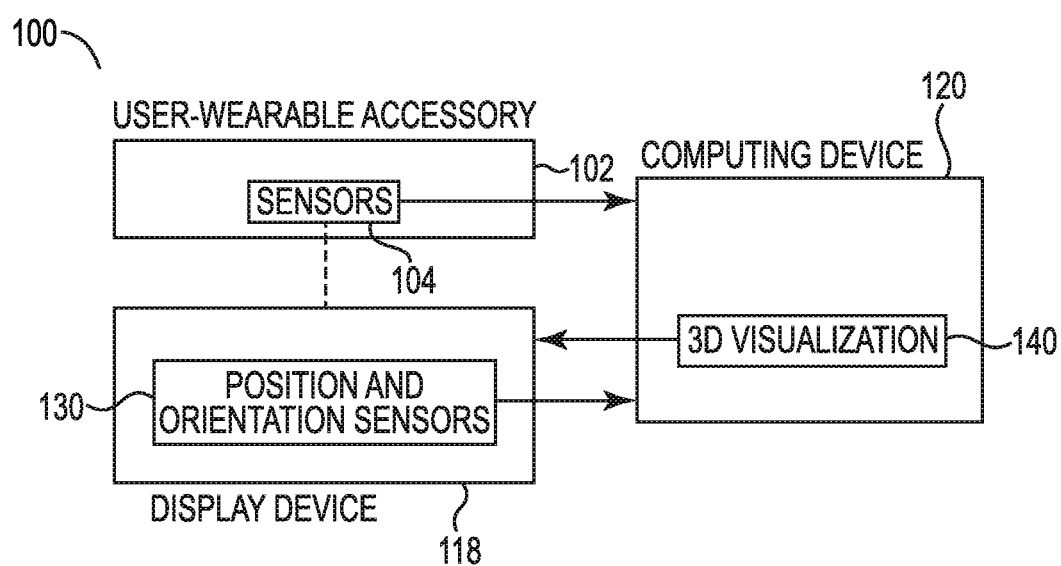
FIG. 1 is a block diagram of a display system according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Augmented reality (AR) and virtual reality (VR) systems may include a head-mounted display (HMD) that is tracked in the 3D workspace, along with controllers for each hand, which are also tracked. The systems allow the user to interact with the virtual world. However, these systems do not track the orientation of the user's body with respect to the HMD, instead the VR system tends to assume that the body is upright and pointing in the same direction as the user's HMD. This can cause a number of issues that can diminish the user's sense of immersion.

For example, some applications may generate avatars of the user's arms, rather than just having avatars of the tracked controllers floating in space. Knowing the position of the user's shoulders, rather than guessing from the way the HMD is pointing, allows for a more convincing simulation of the user's arms. For another example, in some gaming scenarios, virtual items may be carried on the player's body. Reaching for such items works more convincingly if the items are located where the user feels their body to be, and not some position relative to the HMD. Consider, for example, the case of a player crouching and looking to the left. Based on the orientation of the HMD, the motion to draw a virtual weapon from a virtual holster on the user's right hip may be detected by the system as the user moving their hand behind their back. Similar benefits would also apply to non-gaming systems that have body mounted components (e.g., hot swappable batteries in a backpack form-factor system).

For another example, in applications where the user is wearing a haptic vest or a similar item, which provides physical feedback to the user's body from the virtual environment, it may be confusing to the user if the location of the feedback does not actually coincide with the associated virtual object. So, for example, if a user is looking to the left and walks forward into an object, the user should not feel that object strike the user on the right side. When the user looks to the left, the VR software may assume that the player has also rotated their body to face left, thus creating an incorrect orientation between the player's virtual body and their actual body.

Some implementations are directed to providing an AR/VR application running on a backpack form-factor system with information as to the orientation of the user's torso. A backpack form-factor, wherein the computing device running the VR application is worn on the user's back, allows untethered movement for the user without the expense and limitations of wireless video/data links. Some examples provide the ability to track a user's torso without resorting to the expense and complexity of an additional room-scale tracker. Some examples exploit the physical proximity between the top of a backpack worn by a user and the HMD worn by the user to enable tracking the orientation of the backpack with respect to the already-tracked HMD.

Some examples are directed to a system and method for torso tracking in a virtual reality or augmented reality display system. The system may include a user-wearable accessory, such as a backpack, and a HMD that includes sensing capabilities to sense an absolute position and orientation of the HMD. The backpack includes sensing capabilities to sense a relative position and orientation of the HMD relative to the backpack. Since the system knows the absolute position and orientation of the HMD, the absolute position and orientation of the backpack (and, correspondingly, the absolute position and orientation of the torso of the user wearing the backpack) can be determined using the sensed relative information.

FIG. 1 is a block diagram of a display system 100 according to one example. The display system 100 includes a user-wearable accessory 102, a display device 118, and a computing device 120. The user-wearable accessory 102 includes sensors 104.

In one example, the display device 118 is a virtual reality (VR) or augmented reality (AR) display device, or other 3D output device. The display device 118 includes position and orientation sensors 130, and is connected to computing device 120. In other examples, the computing device 120 may be included in the user-wearable accessory 102 (e.g., as part of a backpack form-factor 3D display system), or in the display device 118 (e.g., as part of a cell-phone-based 3D headset). The computing device 120 generates a 3D visualization 140. The display device 118 may be any device that implements a viewing surface to represent the 3D visualization 140. In an example, the display device 118 is a HMD device, such as a VR headset implementing stereoscopic images called stereograms to represent the 3D visualization 140. The 3D visualization 140 may include still images or video images. The VR headset may present the 3D visualization 140 to a user via a number of ocular screens. In an example, the ocular screens are placed in an eyeglass or goggle system allowing a user to view both ocular screens simultaneously. This creates the illusion of a 3D visualization 140 using two individual ocular screens.

The position and orientation sensors 130 may include a gyroscopic device, an accelerometer, a magnetometer, and other tracking devices. The sensors 130 may be used to detect the position and orientation of the display device 118 in 3D space as the display device 118 is positioned on the user's head. The sensors 130 may provide this data to a processor in the computing device 120 such that movement of the display device 118 as it sits on the user's head is translated into a change in the point of view within the 3D visualization 140.

Although one example uses a VR headset to present the 3D visualization 140, other types of environments may also be used. In an example, an AR environment may be used where aspects of the real world are viewable in a visual representation while a 3D object is being drawn within the AR environment. Thus, much like the VR system described herein, an AR system may include a visual presentation provided to a user via a computer screen or a headset including a number of screens, among other types of devices to present the 3D visualization 140. Thus, the present description contemplates the use of not only a VR environment but an AR environment as well.

In one example, the user-wearable accessory 102 is a backpack, and the sensors 104 are positioned on a top surface of the backpack. Thus, when the backpack and the display device 118 (e.g., a HMD) are both worn by a user, the sensors 104 will be in close proximity to the HMD. In one example, the sensors 104 on the backpack detect the relative orientation and position of the HMD. This sensed relative orientation and position information is transmitted to the computing device 120. Since the computing device 120 knows the absolute position and orientation of the HMD (based on information generated by sensors 130), the absolute position and orientation of the backpack (and, correspondingly, the absolute position and orientation of the user's torso) can be calculated by computing device 120 using this relative information.

In one example, the various subcomponents or elements of the system 100 may be embodied in a plurality of different systems, where different modules may be grouped or distributed across the plurality of different systems. To achieve its desired functionality, system 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

The data storage devices of system 100 may include various types of memory modules, including volatile and nonvolatile memory. For example, the data storage devices may include Random Access Memory (RAM), Read Only Memory (ROM), and Hard Disk Drive (HDD) memory. Many other types of memory may also be utilized, and the present specification contemplates the use of many varying type(s) of memory in the data storage devices as may suit a particular application. In certain examples, different types of memory may be used for different data storage needs. For example, in certain examples, the processing devices may boot from Read Only Memory (ROM), maintain nonvolatile storage in Hard Disk Drive (HDD) memory, and execute program code stored in Random Access Memory (RAM).

The data storage devices described herein may include a computer readable medium, a computer readable storage medium, or a non-transitory computer readable medium, among others. For example, the data storage devices may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

Figure 2:
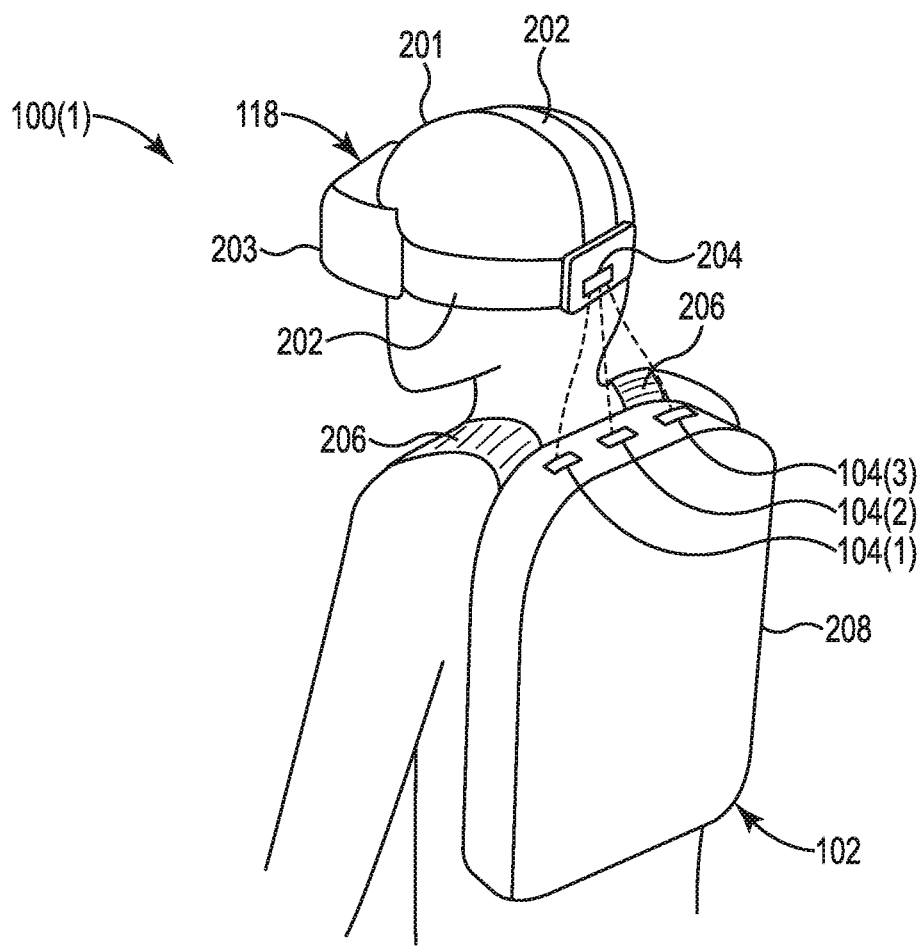
FIG. 2 is a diagram illustrating the display system shown in FIG. 1 positioned on a user according to one example.

FIG. 2 is a diagram illustrating the display system 100 shown in FIG. 1 positioned on a user 201 according to one example. The example of the display system 100 shown in FIG. 2 is identified by reference number 100(1). In the illustrated example, the display device 118 is a HMD display device that includes goggles 203 and straps 202; and the user-wearable accessory 102 is a backpack for a backpack form-factor VR system. The backpack includes shoulder straps 206 and a pack portion 208. In one example, the pack portion 208 includes the computing device 120 (FIG. 1). In another example, the pack portion 208 is the computing device 120. The straps 202 of the display device 118 extend from the goggles 203 across the top and sides of the head of the user 201 to the back of the head of the user 201. The pack portion 208 of the accessory 102 is positioned on the back of the user 201, and is held in place in that position by the attached shoulder straps 206.

As shown in FIG. 2, sensors 104(1)-104(3) (collectively referred to as sensors 104) are positioned on an outer surface of a top portion of the pack portion 208 of the backpack in close proximity to the display device 118. A tracking element 204 is positioned on the straps 202 of the display device 118 at the back of the head of the user 201. In one example, the sensors 104 on the backpack detect the relative position and orientation of the display device 118. The physical proximity between the sensors 104 and the display device 118 simplifies the tracking task. The tracking task is further simplified as the relative motions of the display device 118 and the backpack are constrained by the limitations of the human neck. Also, the backpack's orientation with respect to vertical (gravity) can be sensed using accelerometers as part of sensors 104, so the system can focus solely on the task of determining the relative rotations of the backpack and the display device 118 about the vertical axis (i.e., how the user's head is turned left or right with respect to their torso).

In one example, the sensors 104 on the backpack track the back of the straps 202 used to secure the display device 118 to the head of the user 201. This tracking may be facilitated by the use of tracking element 204. In one example, the tracking element 204 may be a fiducial mark, and the sensors 104 may include an infrared (IR) image sensor and illuminator that are used to track the position of the fiducial mark.

Multiple sensors 104 positioned along the top of the backpack may be used to triangulate the position of the back of the display device 118. In another example, the tracking element 204 may be a retro-reflector, and the sensors 104 may include a strip of illuminators and associated photoreceptors that are used to track the position of the retro-reflector. In another example, the tracking element 204 may be a permanent magnet, and the sensors 104 may include at least one linear Hall-effect sensor that is used to track the position of the permanent magnet. In another example, the sensors 104 and the tracking element 204 each include at least one planar coil, and the angle-dependent strength of coupling between the planar coils are used to track the position of the display device 118.

Figure 3:
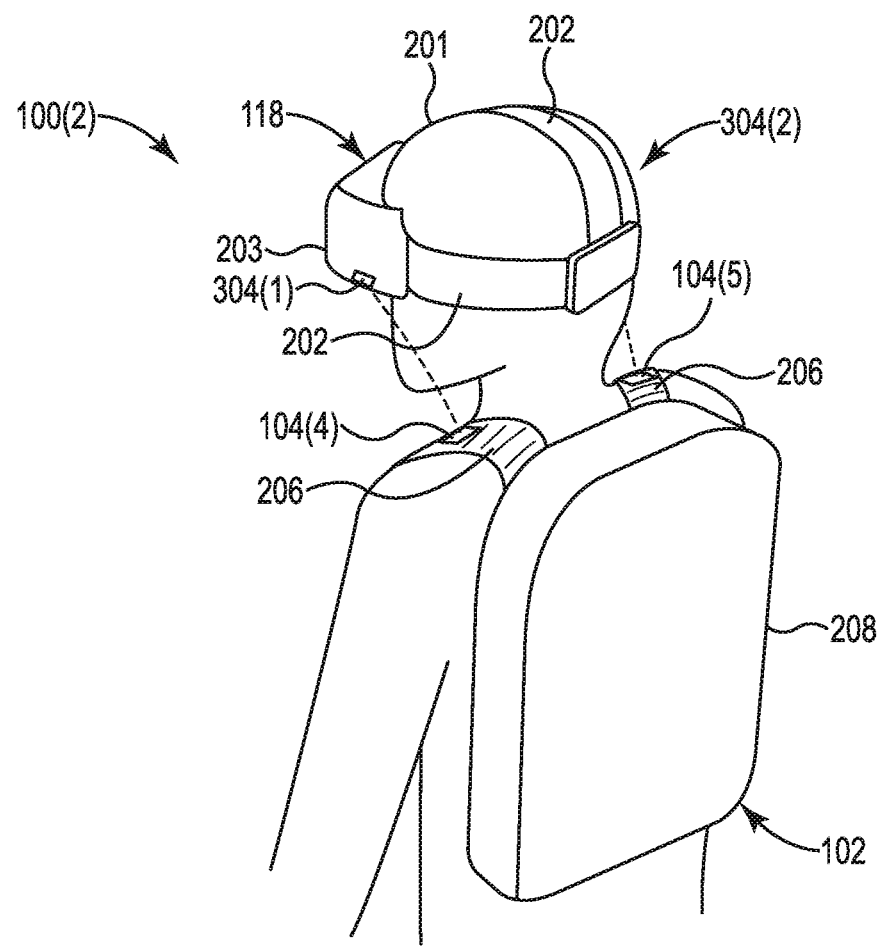
FIG. 3 is a diagram illustrating the display system shown in FIG. 1 positioned on a user according to another example.

FIG. 3 is a diagram illustrating the display system 100 shown in FIG. 1 positioned on a user 201 according to another example. The example of the display system 100 shown in FIG. 3 is identified by reference number 100(2). In the illustrated example, the display device 118 is a HMD display device that includes goggles 203 and straps 202; and the user-wearable accessory 102 is a backpack for a backpack form-factor VR system. The backpack includes shoulder straps 206 and a pack portion 208. In one example, the pack portion 208 includes the computing device 120 (FIG. 1). In another example, the pack portion 208 is the computing device 120. The straps 202 of the display device 118 extend from the goggles 203 across the top and sides of the head of the user 201 to the back of the head of the user 201. The pack portion 208 of the accessory 102 is positioned on the back of the user 201, and is held in place in that position by the attached shoulder straps 206.

As shown in FIG. 3, sensors 104(4)-104(5) (collectively referred to as sensors 104) are positioned on a top surface of the shoulder straps 206 of the backpack directly above the shoulders of the user 201. Tracking elements 304(1)-304(2) (note that tracking element 304(2) is not visible in FIG. 3) are positioned on the left and right sides, respectively, of the goggles 203 of the display device 118. In one example, the sensors 104 on the backpack straps 206 track the position of the tracking elements 304(1)-304(2) to determine the position and orientation of the display device 118 relative to the backpack. In another example, the sensors 104 are positioned on the display device 118 and the tracking elements 304(1)-304(2) are positioned on the backpack (e.g., on the backpack straps 206), and the sensors 104 track the position of the tracking elements 304(1)-304(2) on the backpack to determine the position and orientation of the backpack relative to the display device 118.

In another example, the relative orientations of the display device 118 and the backpack are tracked using the flex and extension of a cable connecting them (e.g., by using pressure sensitive films or optical-fiber-based curvature sensors).

Although the examples illustrated in FIGS. 2 and 3 show the sensors 104 as part of a backpack form-factor 3D display system, in other examples, other forms of wearable accessories may be used to hold the sensors 104 in the appropriate locations (e.g., as part of a haptic vest).

Figure 4:
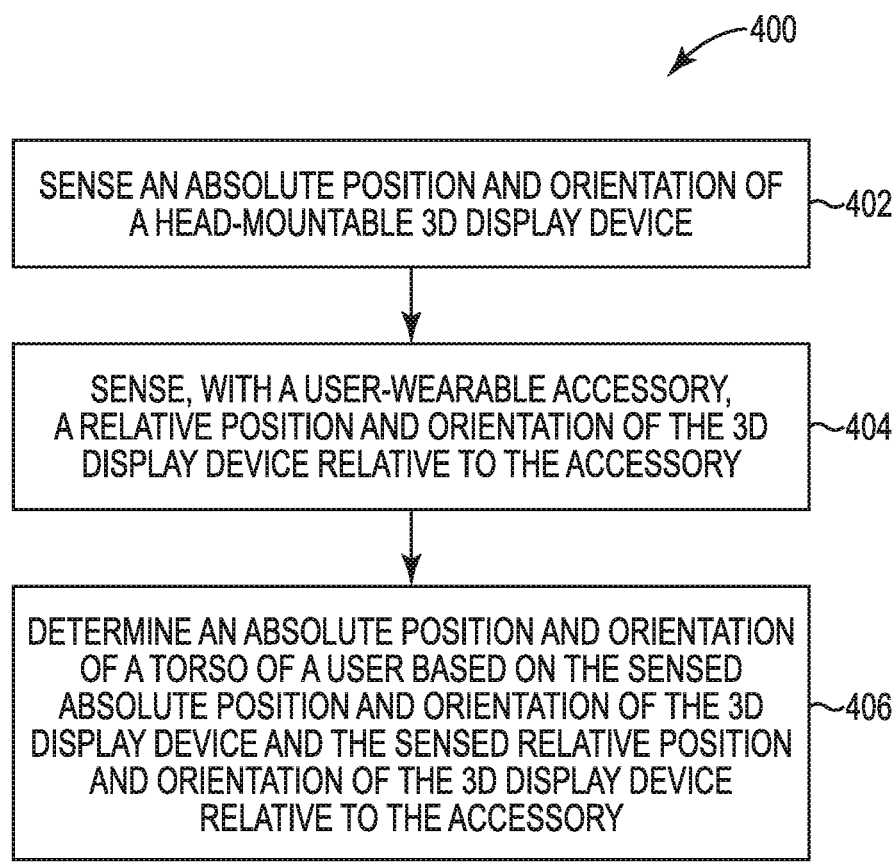
FIG. 4 is a flow diagram illustrating a method for tracking the position and orientation of a user's torso with a display system according to one example.

One example is directed to a method for tracking the position and orientation of a user's torso with a display system. FIG. 4 is a flow diagram illustrating a method 400 for tracking the position and orientation of a user's torso with a display system according to one example. In one example, display system 100 (FIG. 1) performs method 400. At 402 in method 400, an absolute position and orientation of a head-mountable 3D display device is sensed. At 404, a user-wearable accessory senses a relative position and orientation of the 3D display device relative to the accessory. At 406, an absolute position and orientation of a torso of a user is determined based on the sensed absolute position and orientation of the 3D display device and the sensed relative position and orientation of the 3D display device relative to the accessory.

The method 400 may further include transmitting information representing the sensed relative position and orientation of the 3D display device from the user-wearable accessory to a computing device that drives the 3D display device. The user-wearable accessory in method 400 may be a backpack that includes the computing device.

Another example is directed to a display system that includes a head-mountable 3D display device including at least one sensor to sense an absolute position and orientation of the 3D display device. The display system includes an accessory wearable by a user. The accessory includes at least one sensor to sense a relative position and orientation of the 3D display device relative to the accessory. An absolute position and orientation of a torso of the user may be determined based on the sensed absolute position and orientation of the 3D display device and the sensed relative position and orientation of the 3D display device relative to the accessory.

The 3D display device may be one of a virtual reality (VR) display device or an augmented reality (AR) display device. The accessory may be a backpack that includes a pack portion and shoulder straps. The pack portion may include a computing device to drive the 3D display device, and the at least one sensor of the backpack may be positioned on a top surface of the computing device. The at least one sensor of the backpack may be positioned on at least one of the shoulder straps. The 3D display device may include at least one strap to hold the 3D display device on the user's head, and the 3D display device may include a tracking element positioned on the at least one strap that is tracked by the at least one sensor of the accessory. The tracking element may be a fiducial mark. The tracking element may be a retro-reflector. The tracking element may be a permanent magnet. The tracking element may be a planar coil.

Yet another example is directed to a display system that includes a 3D display device mountable on a user's head and including at least one sensor to sense an absolute position and orientation of the 3D display device. The display system includes a backpack in communication with the 3D display device and including at least one sensor to sense a relative position and orientation of the 3D display device relative to the backpack. The display system includes a controller to determine an absolute position and orientation of a torso of the user based on the sensed absolute position and orientation of the 3D display device and the sensed relative position and orientation of the 3D display device relative to the backpack.

The backpack may include a pack portion and shoulder straps, wherein the pack portion includes a computing device to drive the 3D display device, and the at least one sensor of the backpack may be positioned on one of a top portion of the computing device or on at least one of the shoulder straps.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display system, comprising:
a head-mountable 3D display device including at least one sensor to sense an absolute position and orientation of the 3D display device; and
an accessory separate from the 3D display device and wearable by a user on a portion of a body of the user below a head of the user, the accessory including at least one sensor to sense a relative position and orientation of the 3D display device relative to the accessory, wherein the 3D display device includes a tracking element that is tracked by the at least one sensor of the accessory to continually determine the relative position and orientation of the 3D display device relative to the accessory, wherein an absolute position and orientation of a torso of the user may be determined based on the sensed absolute position and orientation of the 3D display device and the sensed relative position and orientation of the 3D display device relative to the accessory.

2. The display system of claim 1, wherein the 3D display device is one of a virtual reality (VR) display device or an augmented reality (AR) display device.

3. The display system of claim 1, wherein the accessory is a backpack that includes a pack portion and shoulder straps.

4. The display system of claim 3, wherein the pack portion includes a computing device to drive the 3D display device, and wherein the at least one sensor of the backpack is positioned on a top surface of the computing device.

5. The display system of claim 3, wherein the at least one sensor of the backpack is positioned on at least one of the shoulder straps.

6. The display system of claim 1, wherein the 3D display device includes at least one strap to hold the 3D display device on the user's head, and wherein the tracking element is positioned on the at least one strap.

7. The display system of claim 6, wherein the tracking element is a fiducial mark.

8. The display system of claim 6, wherein the tracking element is a retro-reflector.

9. The display system of claim 6, wherein the tracking element is a permanent magnet.

10. The display system of claim 6, wherein the tracking element is a planar coil.

11. A method, comprising:
sensing an absolute position and orientation of a head-mountable 3D display device;
sensing, with a user-wearable accessory that is separate from the 3D display device and is wearable on a portion of a body of the user below a head of the user, a relative position and orientation of the 3D display device relative to the accessory;
transmitting information representing the sensed relative position and orientation of the 3D display device from the user-wearable accessory to a computing device that drives the 3D display device, and
determining, with the computing device, an absolute position and orientation of a torso of a user based on the sensed absolute position and orientation of the 3D display device and the sensed relative position and orientation of the 3D display device relative to the accessory.

12. The method of claim 11, wherein the user-wearable accessory is a backpack that includes the computing device.

13. A display system, comprising:
a 3D display device mountable on a user's head and including at least one sensor to sense an absolute position and orientation of the 3D display device;
a backpack in communication with the 3D display device and including at least one sensor to sense a relative position and orientation of the 3D display device relative to the backpack, wherein the 3D display device includes a tracking element that is tracked by the at least one sensor of the backpack to continually determine the relative position and orientation of the 3D display device relative to the backpack; and
a controller to determine an absolute position and orientation of a torso of the user based on the sensed absolute position and orientation of the 3D display device and the sensed relative position and orientation of the 3D display device relative to the backpack.

14. The display system of claim 13, wherein the backpack includes a pack portion and shoulder straps, wherein the pack portion includes a computing device to drive the 3D display device, and wherein the at least one sensor of the backpack is positioned on one of a top surface of the computing device or on at least one of the shoulder straps.

15. The display system of claim 13, wherein the tracking element is one of a fiducial mark, a retro-reflector, a permanent magnet, or a planar coil.

16. The display system of claim 1, wherein the accessory is to transmit information representing the sensed relative position and orientation of the 3D display device to a computing device that drives the 3D display device.

* * * * *